United States Patent [19]
Kawabata

[11] 3,760,828
[45] Sept. 25, 1973

[54] PURE FLUID CONTROL ELEMENT
[75] Inventor: Minoru Kawabata, Kariya, Japan
[73] Assignee: Toyoda Koki Kabushiki Kaisha, Kariya City, Japan
[22] Filed: Nov. 15, 1971
[21] Appl. No.: 198,737

Related U.S. Application Data
[63] Continuation of Ser. No. 3,023, Jan. 15, 1970, abandoned.

[52] U.S. Cl. ............................................. 137/81.5
[51] Int. Cl. ............................................. F15c 1/16
[58] Field of Search.................... 137/81.5; 235/201

[56]   References Cited
   UNITED STATES PATENTS

| | | |
|---|---|---|
| 3,233,622 | 2/1966 | Boothe............................ 137/81.5 |
| 3,331,382 | 7/1967 | Horton............................ 137/81.5 |
| 3,452,772 | 7/1969 | Zaloudek......................... 137/81.5 |
| 3,470,894 | 10/1969 | Rimmer........................... 137/81.5 |
| 3,500,849 | 3/1970 | McLeod, Jr. .................... 137/81.5 |
| 3,513,867 | 5/1970 | Manion............................ 137/81.5 |
| 3,529,614 | 9/1970 | Nelson............................ 137/81.5 |
| 3,605,778 | 9/1971 | Metzger.......................... 137/81.5 |
| 3,654,944 | 4/1972 | Laakanemi et al.............. 137/81.5 |
| 3,674,044 | 7/1972 | Mayer............................. 137/81.5 |

Primary Examiner—Samuel Scott
Attorney—Brisebois & Kruger

[57]   ABSTRACT

In order to perform both digital and analog functions when relatively small loads are encountered by fluid leaving its vent passages, a pure fluid control element comprises main fluid inlet means supplied with a fluid to be controlled, fluid flow outlet means disposed downstream of the main fluid inlet means at a predetermined distance to receive the controlled flow from the main inlet means, vortex means between the main fluid inlet means and fluid flow outlet means for producing a vortex flow to attract the fluid from the main inlet means, vent passage means adjacent the fluid flow outlet means and extending into said vortex means, and control fluid inlet means extending into said vortex means in the same direction as the vortex flow and supplied with a control flow for regulating the vortex flow to control the deflection of the fluid from the main fluid inlet means.

4 Claims, 3 Drawing Figures

PURE FLUID CONTROL ELEMENT

This is a continuation of application Ser. No. 003,023, filed Jan. 15, 1970, now abandoned.

SUMMARY OF THE INVENTION

This invention relates to pure fluid control elements, and more particularly to a pure fluid control element which can perform both digital and analog functions.

Conventionally a fluid control system has been used wherein pure fluid control elements having a digital characteristic and elements having an analog characteristic are interconnected. However, no known elements perform both digital and analog functions.

It is therefore an object of the invention to provide a novel and useful pure fluid control element.

It is another object of this invention to provide a pure fluid control element performing both digital and analog functions when relatively small or no loads are encountered by fluid leaving its vent passages.

It is yet another object of the invention to provide a pure fluid control element performing only an analog function when relatively large loads are encountered by fluid leaving its vent passages.

It is a further object of the invention to provide a pure fluid control element wherein a small control pressure may deflect a large amount of the main fluid flow.

BRIEF DESCRIPTION OF THE DRAWINGS

The foregoing and other objects of the present invention will become fully apparent from the following description of a preferred embodiment of the present invention with reference to the accompanying drawings, in which.

DESCRIPTION OF THE INVENTION

Figure 1:
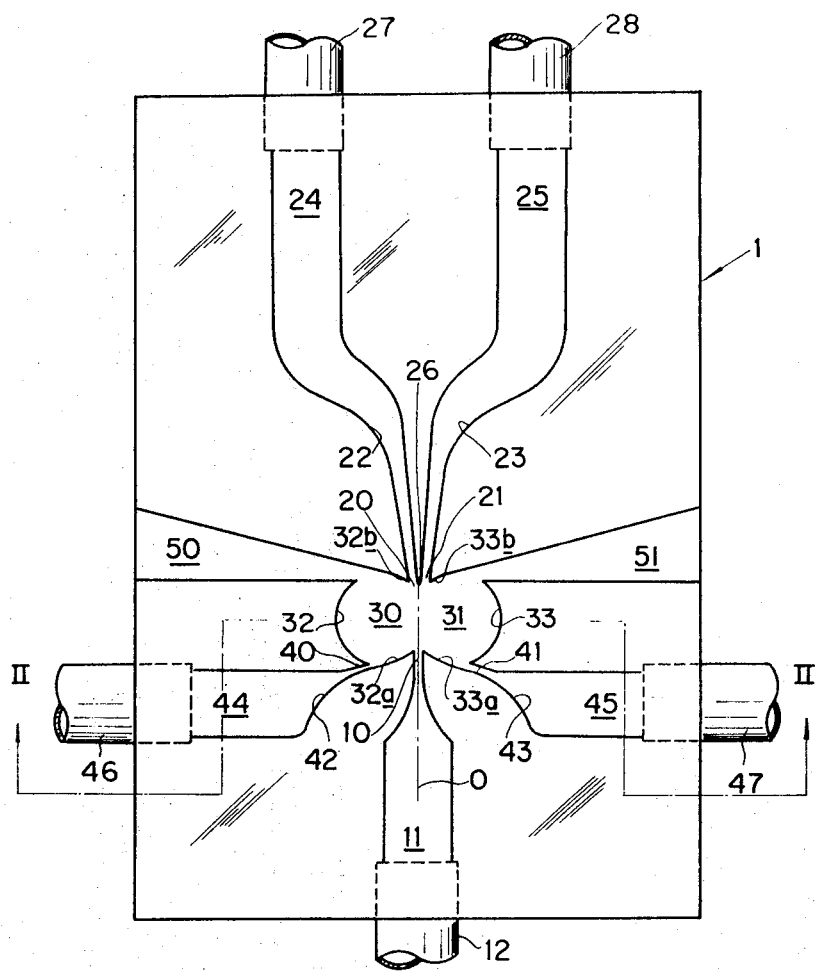
FIG. 1 is a plan view showing a pure fluid control element according to the present invention.
Figure 2:
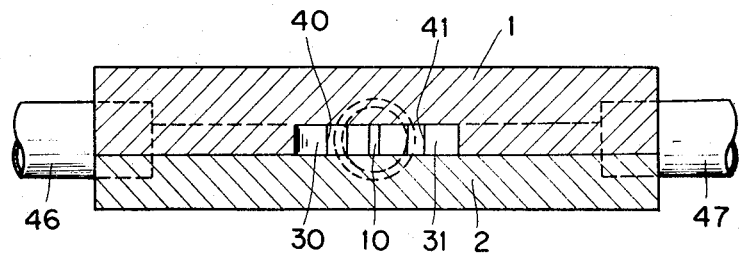
FIG. 2 is a sectional view taken along the line II—II of FIG. 1.

Referring now to FIGS. 1 and 2, FIG. 1 is a bottom plan view of the upper part 1 of a pure fluid control element according to the present invention which is sealed to a flat plate 2. It should be apparent that the particular means by which the plates 1, 2 are secured together is not critical, so long as the connection is sufficiently tight to insure that no fluid can leak from the pure fluid element. Plates 1 and 2 may be made of a metal, plastic, ceramic, or any other suitable material, and for purposes of illustration, these plates are shown as made of a transparent plastic. In this embodiment, the pure fluid control element comprises two flat plates, although it may be also made from three flat plates.

A main supply nozzle 10, the outlet of which is narrowed, is connected to a supply passage 11. A pair of receiving ports 20 and 21, separated by a divider 26, are positioned at a predetermined distance from the main supply nozzle 10 to receive fluid supplied through the main nozzle 10. The receiving ports 20 and 21 are connected to output ports 24 and 25 respectively. The fluid streams pass through the passages 22 and 23 which gradually increase in cross-sectional area.

A pair of substantially circular and overlapping vortex chambers 30 and 31 are formed between the main nozzle 10 and the receiving ports 20, 21. These chambers 30, 31 are symmetrical with respect to the center line 0 which passes through the main nozzle 10. Circular walls 32 and 33 of the vortex chambers 30 and 31 terminate at the outlets of the main nozzle 10 and at the receiving ports 20 and 21. A pair of control nozzles 40 and 41, which are adjacent to the main nozzle 10 and opposite to each other, extend tangentially into the vortex chambers 30 and 31 with relatively small part-circular walls 32a and 33a between the main nozzle 10 and the control nozzles 40 and 41. The control nozzles 40 and 41 are connected to control pipes 46 and 47 respectively. A fluid is supplied through control ports 44 and 45, and control passages 42 and 43 as the controlling input. A pair of vent passages 50 and 51 are positioned adjacent the receiving ports 20 and 21 respectively. The vent passages 50 and 51 are opposite the receiving ports 20 and 21 and extend tangentially into the vortex chambers 30 and 31, terminating in relatively small and part-circular walls 32b and 33b. Between the receiving ports 20, 21 and vent passages 50, 51 reasonable spaces are provided. The effective cross-sectional areas of the vent passages 50 and 51 increase gradually from their inner ends toward their outer ends. The ends of the passages 50 and 51 are vented to the atmosphere. Fluid under pressure, such as compressed air from a supply source (not shown), is supplied to the main nozzle 10 through a supply pipe 12 and the supply passage 11. Pressure fluid passing through the receiving ports 20 and 21 is fed to any other device which is to be operated by the fluid through the output passages 22, 23, the output ports 24, 25 and the output pipes 27, 28.

When the main pressure fluid, such as compressed air, is introduced into the vortex chambers from the supply source, through the supply pipe 12, the supply port 11 and the main nozzle 10, the main fluid may be deflected toward one of the vortex chambers, say the right vortex chamber 31 if some slight perturbation occurs in the main flow. Then the greater part of the main fluid follows along the walls 33b and 33, to produce a vortex flow within the right vortex chamber 31. The main stream of fluid is attracted by the vortex flow and is further deflected to the right and maintained stable.

In this stable condition, the greater part of the main fluid is discharged to the atmosphere through the vent passage 51. Therefore, the receiving port 21 receives only a small part of the main flow of fluid and thus only a relatively low pressure is applied to the output port 25. On the other hand, the receiving port 20 is not supplied with the main fluid, and the pressure in the receiving port 20 tends to be negative due to the entrainment effect of the main fluid deflected to the right.

When a control input is introduced tangentially into the vortex chamber 31 through the control port 45 and the control nozzle 41, the pressure in the lower portion of the vortex chamber is raised to shift the center of the vortex flow upward, and thereby decrease the deflection of the main fluid to the right. In this case, the fluid flow into the receiving port 21 is increased and the output pressure in the output port 25 is increased in proportion to the control input. Therefore, the vent passage 51 necessarily receives a decreased amount of the main fluid.

Since the control nozzle 41 extends tangentially into the vortex chamber 31 and the control flow is introduced in the same direction as the vortex flow, a small control flow in the control nozzle 41 can divert a much larger main fluid flow from right to left. Thus, a large gain in output pressure may be obtained by causing only a small increase in control pressure.

When the control input supplied to the control nozzle 41 reaches a predetermined value, the main fluid is switched from right to left and is attracted to the left for stabilization by the vortex flow produced in the left vortex chamber 30. Since the greater part of the main stream of fluid has been deflected to the right, this stream produces vortex flow in the left vortex chamber 30 and is vented to the atmosphere through the passage 50. Thus relatively low pressure is applied to the output port 24 through the outlet port 20. On the other hand, the pressure at the output port 25 tends to be negative. When a control input is introduced tangentially into the vortex chamber 30 through the control nozzle 40, the pressure in the lower portion of the vortex chamber 30 is raised to shift the center of the vortex flow upward, thereby decreasing the leftward deflection of the main fluid. When the control input reaches a predetermined value, the main fluid is shifted from left to right.

Figure 3:
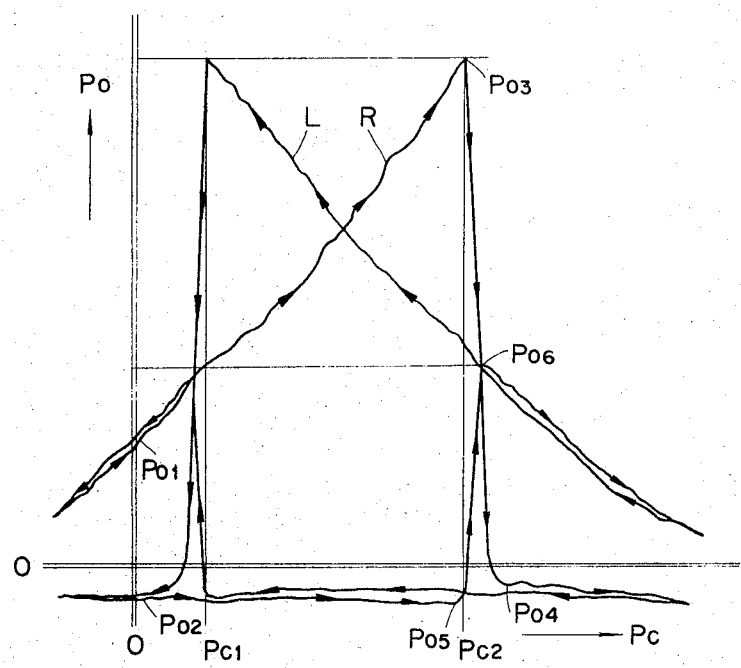
FIG. 3 is a diagram showing its output pressure characteristics as a function of a control pressure.

Referring to FIG. 3, which shows the operating characteristic of the output pressure PO in each of the output ports 24 and 25 as a function of the change in the control pressure PC in the control nozzle 41 with a predetermined biasing pressure applied to the control nozzle 40 and with the main fluid initially deflected to the right vortex chamber 31, a solid line R shows the output pressure in the right output port 25 and a solid line L shows the output pressure in the left output port 24. When the control pressure PC in the control nozzle 41 is zero, the output pressure in the output port 25 is PO1, and that in the output port 24 is PO2. When the control pressure PC is increased, the output pressure in the output port 25 is gradually increased, but that in the output port 24 remains substantially constant. When the control pressure reaches PC2, the main fluid is shifted from right to left, so that the pressure in the output port 25 is suddenly decreased from PO3 to PO4, and that in the output port 24 is suddenly increased from PO5 to PO6. When the control pressure PC is further increased, the pressure in the output port 24 is gradually decreased, but that in the output port 25 remains substantially constant. When the control pressure PC is further decreased, the pressure in the output port 24 is gradually increased while that in the output port 25 remains substantially constant. However, the main fluid is not shifted at the control pressure, PC2, but is shifted at a lower control pressure, PC1.

As will be understood from the above description, the pure fluid control element according to the present invention has a digital characteristic and also has an analog function except for switching conditions. Thus, the present element may be used as a digital component. Furthermore, this element may be used as an analog component, using only the analog characteristic, or both digital and analog characteristics may be used. Thus, the present invention has the advantage that one element may be utilized for a plurality of purposes.

The pressures in the vent passages 50 and 51 have characteristics substantially inverse to those in the output ports 24 and 25, respectively, and thus, devices responsive to relatively low loads may be connected to the vent passages 50 and 51.

In the above embodiment, the vent passages 50 and 51 are vented to the atmosphere. However, when relatively high loads are applied to the vent passages 50 and 51, experiments have shown that the element does not have a digital characteristic, but has only an analog characteristic.

While only one specific embodiment of the invention has been described, it should be understood that the novel concept of the invention may be incorporated into other embodiments without departing from the basic principles of the invention as defined in the following claims.

What is claimed is:

1. A pure fluid control element comprising:
   a main fluid inlet for receiving a fluid to be controlled,
   a pair of fluid flow outlets positioned at a predetermined distance downstream of said main fluid inlet to receive the fluid from said main fluid inlet,
   a pair of substantially circular and overlapping vortex chambers between said main fluid inlet and fluid flow outlets and symmetrically positioned with respect to the center line passing through said main fluid inlet to produce a vortex flow which attracts the fluid from said main fluid inlet,
   a pair of vent passages adjacent said fluid flow outlets and opposite to each other and extending into said vortex chambers, respectively, and
   a control inlet for each vortex chamber for aperiodically supplying to its respective vortex chamber a control fluid which acts on the vortex flow therein in order to control the deflection of the fluid from the main fluid inlet, each control inlet being defined in part by a curved wall extending into its respective vortex chamber to direct the fluid flow from that control inlet substantially tangentially of said respective chamber in the same direction as the vortex flow produced in said respective chamber, whereby a gradual increase in the control fluid pressure supplied through the control inlet for one vortex chamber first gradually transfers the pressure of fluid received through said main fluid inlet from the vent in said one vortex chamber to the outlet in the same chamber, and then abruptly transfers said pressure to the other vortex chamber when a threshold control fluid pressure is reached.

2. A pure fluid control element as claimed in claim 1, wherein one of said pair of vent passages extends tangentially into each of said pair of vortex chambers.

3. A pure fluid control element as claimed in claim 1, wherein said control inlets are adjacent to the main fluid inlet and opposite to each other.

4. A pure fluid control element as claimed in claim 1, wherein said pair of vortex chambers are each substantially circular and overlap, one of said pair of vent passages extends tangentially into each of said vortex chambers, and one of said control inlets extends into each of said pair of vortex chambers, said control inlets being adjacent the main fluid inlet and opposite each other.

* * * * *

UNITED STATES PATENT OFFICE
CERTIFICATE OF CORRECTION

Patent No. 3,760,828     Dated 25 September 1973

Inventor(s) MINORU KAWABATA

It is certified that error appears in the above-identified patent and that said Letters Patent are hereby corrected as shown below:

[30]     Foreign Application Priority Data
    January 31, 1969     Japan.........44-7676

Signed and sealed this 9th day of April 1974.

(SEAL)
Attest:

EDWARD M.FLETCHER,JR.
Attesting Officer

C. MARSHALL DANN
Commissioner of Patents